Sept. 18, 1945.　　　C. R. NALLE　　　2,385,154
ADJUSTABLE CASTER SOCKET
Filed Nov. 12, 1943　　　2 Sheets—Sheet 1
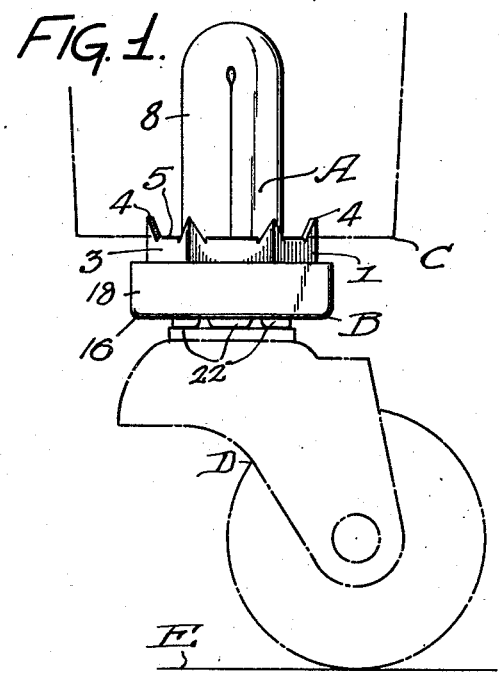
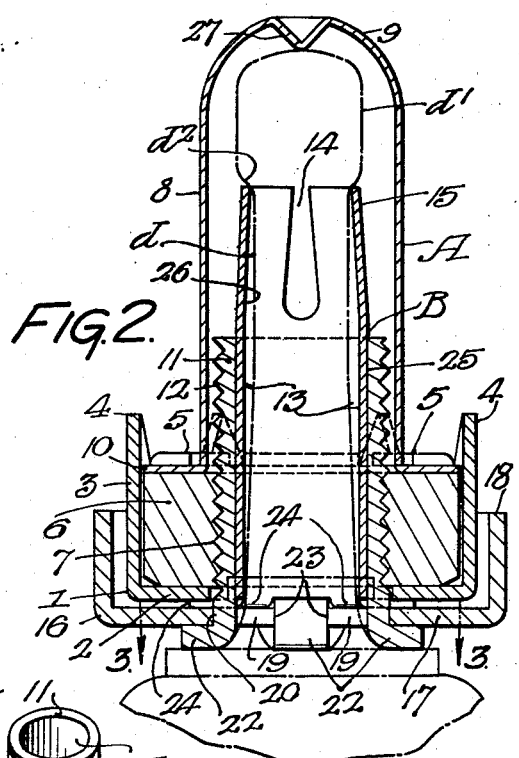
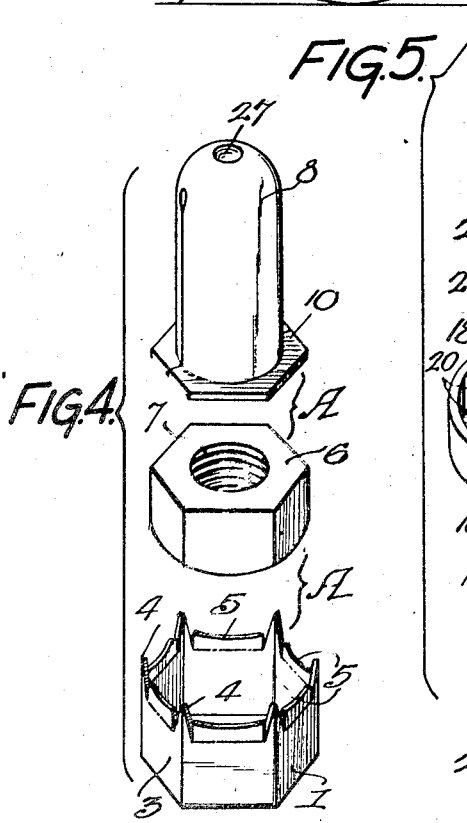
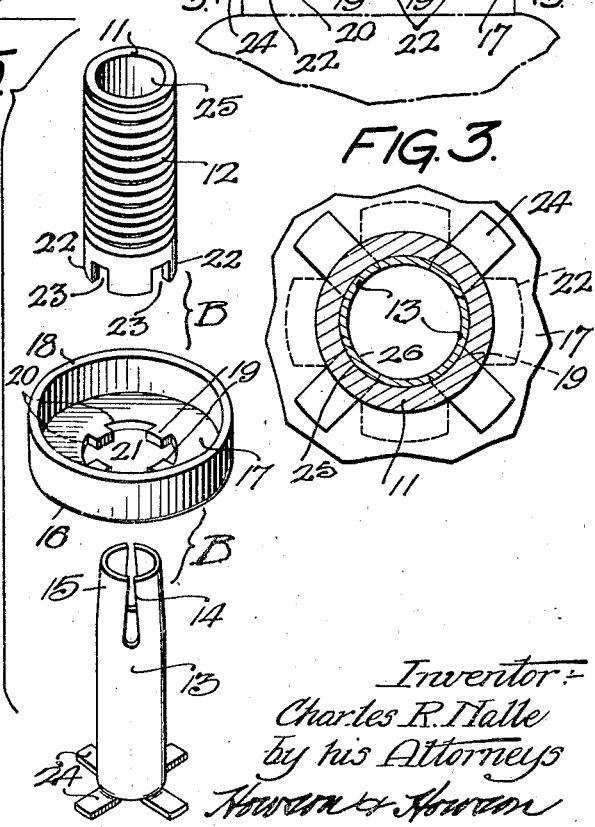
Inventor:
Charles R. Nalle
by his Attorneys Sept. 18, 1945.  C. R. NALLE  2,385,154
ADJUSTABLE CASTER SOCKET
Filed Nov. 12, 1943  2 Sheets-Sheet 2
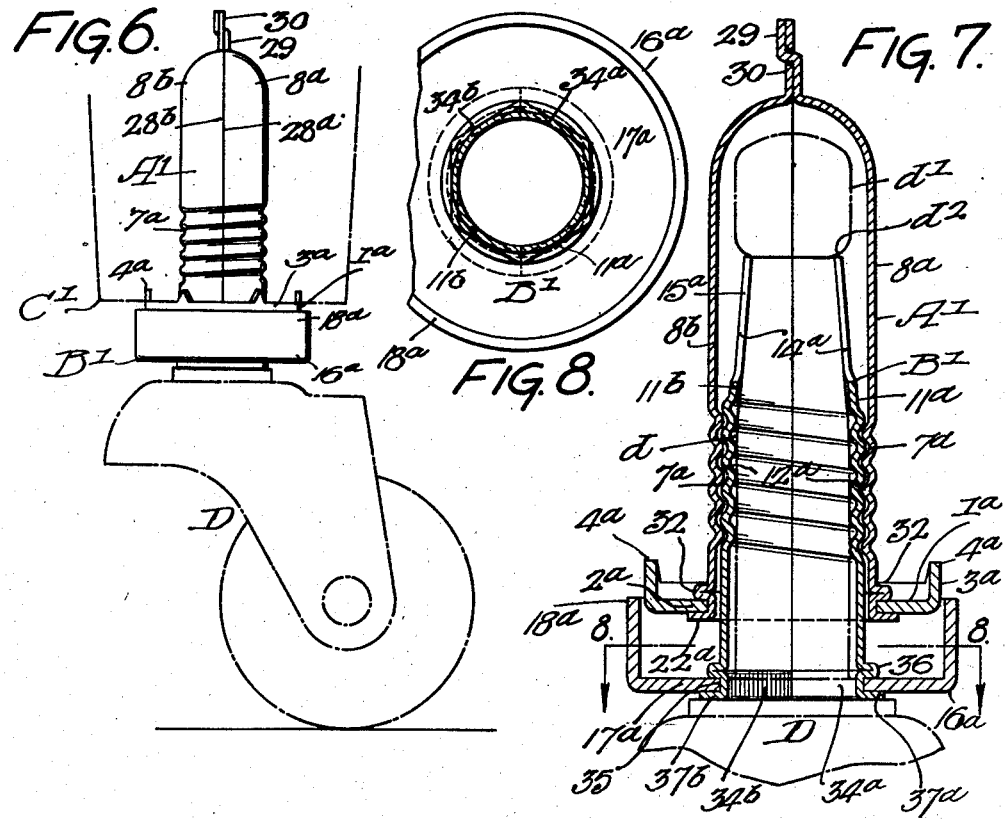
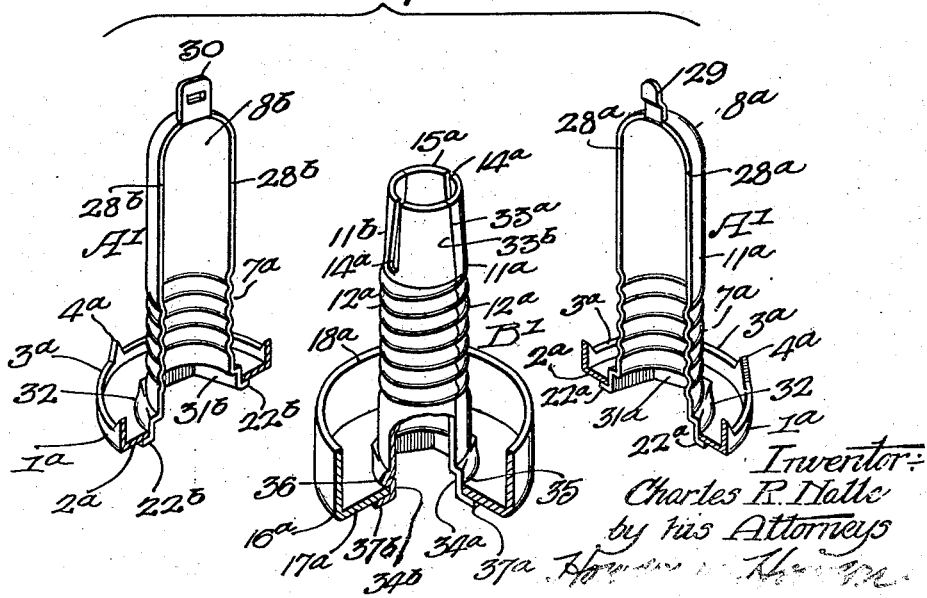

Patented Sept. 18, 1945

2,385,154

UNITED STATES PATENT OFFICE 2,385,154

ADJUSTABLE CASTER SOCKET

Charles R. Nalle, Philadelphia, Pa.

Application November 12, 1943, Serial No. 510,024

14 Claims. (Cl. 16—19)

This invention relates to caster structures for use in the lower ends of the legs of tables, desks, etc., or on the bottoms of cabinets and various other articles. The invention relates particularly to caster structures of the adjustable type, whereby the effective lengths of the legs may be varied to suit prevailing uneven conditions of the surface on which the caster-bearing article is to be supported, and whereby the article may be stabilized, leveled or raised and lowered in toto, within predetermined limits.

One of the objects of the present invention is to provide an adjustable caster structure or socket capable of accommodating any standard type caster or glide assemblies which include a smooth shank, stem or pintle attached to a glide base or the horn or yoke of a wheel type floor contact.

Another object of the invention is to construct at least certain parts of the structure in such a manner to readily be stamped and shaped from sheet metal, as a matter of manufacturing economy.

Other objects of the invention and the construction and operation of the structure as a whole, will be more fully disclosed hereinafter, reference being made to the accompanying drawings, of which:

Fig. 1 is a side elevation of the structure forming the subject of the present invention;

Fig. 2 is an enlarged longitudinal sectional view of the structure shown in Fig. 1;

Fig. 3 is a sectional plan view taken on the line 3—3, Fig. 2;

Fig. 4 is a detached perspective view of the elements of the primary socket forming part of the structure shown in Figs. 1 and 2;

Fig. 5 is a detached perspective view of the elements forming the secondary socket of the structure shown in Fig. 2;

Fig. 6 is a view similar to Fig. 1 illustrating a modified form of the invention;

Fig. 7 is a view similar to Fig. 2 showing an enlarged longitudinal sectional view of the structure shown in Fig. 6;

Fig. 8 is a sectional plan view taken on the line 8—8, Fig. 7; and

Fig. 9 is a detached perspective view, partly in section, of the primary and secondary sockets shown in Figs. 6 and 7.

As shown in Figs. 1 to 5 inclusive, the structure of the present invention comprises a primary socket ensemble A, and a secondary socket ensemble B. The primary socket A is adapted to be installed in a preformed boring in the lower end of a leg C of a table, etc., or in the bottom framework of a cabinet, etc. The secondary socket structure B is adapted to be adjustably mounted in the primary socket A and to receive a smooth surfaced shank $d$ of a roller or other form of caster element supported on a floor or other surface E.

The primary structure ensemble A includes a cup-shaped element 1 consisting of a base bottom 2 and an axially extending marginal flange 3, which latter is provided with alternating axially extending prongs 4 and clinching ears 5. Mounted within the cup-shaped element 1 is a nut 6, having four, six or any desired number of flat sides and seated on the bottom plate 2 within the similarly shaped marginal flange 3 of the cup-shaped element 1, said nut being provided with suitable internal threads 7.

The primary socket A also includes a cylindrical shell 8 having its upper end 9 closed and its opposite end open in axial alignment with the nut 6. The shell 8 is provided with a radial flange 10 having the same shape, preferably, as the nut 6 and which bears on the upper surface of the nut 6. The cup-shaped element 1, the nut 6, and the shell 8 are secured together as an integral base unit by the ears 5 of the cup-shaped element 1 being bent radially inward over and in firm contact with the upper face of the flange 10 of the shell 8.

The secondary socket B comprises an outer sleeve 11 provided with external threads 12 which cooperate with the internal threads 7 of the nut 6, for effecting axial adjustment of the secondary socket B with respect to the primary socket A, upon rotation of the sleeve 11 within the nut 6.

The secondary socket B also includes an inner sleeve 13 which is of hollow tubular construction to receive the smooth shank $d$ of the caster element D. The inner sleeve 13 projects axially beyond the inner end of the outer sleeve 11, and the projected end is of frusto-conical shape provided with longitudinal slots or recesses 14 by which the projected end of the inner sleeve 13 is rendered resilient, to spread radially and slip over the head $d1$ of the shank $d$, and then contract and snap behind the annular shoulder $d2$ at the lower end of the head $d1$. The opposite lower end of the inner sleeve 13 is provided with a plurality of radially extending ears 24.

The secondary socket B also includes a cup-shaped operating element 16 consisting of a bottom plate 17 and an axially extending marginal flange 18, said flange extending up around the cup-shaped element 1 of the primary socket A and partly concealing the same. The bottom plate 17 is provided with a plurality of inwardly projecting radial lugs 19 alternating with segmental recesses 20 which surround a central opening 21 formed in the bottom plate 17 and which are adapted to interfit and interlock with a series of axially extending lugs or ears 22, formed on the lower end of the outer sleeve 11, alternating with a series of axially extending recesses 23, formed in said end of the sleeve 11.

In assembling the secondary socket B, the inner sleeve 13 is slipped through the bore 25 of the outer sleeve 11 and the ears 24, 24 of the lower end of the inner sleeve 13 are seated in the bases of the axial recesses 23, 23 of the outer sleeve 11. The cup-shaped operating element 16 is then put in place, with the radial lugs, 19, 19 of the bottom plate 17 thereof seated in the axial recesses, 23, 23 of the outer sleeve 11, against the undersides of the radial ears 24, 24 of the previously inserted inner sleeve 13, after which the extremities of the axial lugs or ears 22 on the lower end of the outer sleeve 11 are bent outwardly over the underside of the bottom plate 17 of the operating element 16, as shown in Fig. 2.

The secondary socket B is subsequently inserted in the primary socket A, and the external threads 12 of the outer sleeve 11 are brought into threaded engagement with the internal threads 7 of the nut 6 of the primary socket A, after which relative rotation of the one within the other will effect axial relative movement therebetween.

The smooth shank $d$ of the caster D is later inserted within the bore 26 of the inner sleeve 13 of the secondary socket B and the head $d1$ of said shank is forced through the resilient frusto-conical end 15 of the inner sleeve 13, until the upper edge of said frusto-conical end snaps behind the annular shoulder $d2$ on the shank $d$.

In that form of the invention shown in Figs. 6 to 9 inclusive, the primary socket A1 and the secondary socket B1 are directly provided with internal threads $7a$ and external threads $12a$ respectively. These sockets are also provided with cup-shaped elements $1a$ and $16a$ respectively.

The shell of the primary socket A1 is composed of complementary half units $8a$ and $8b$ respectively, stamped and pressed from sheet metal, in which complementary half portions of the internal threads $7a$ are also stamped and shaped. The edges $28a$ and $28b$ of the complementary half units $8a$ and $8b$ are matched and arranged in abutting relation to each other, as clearly shown in Fig. 6.

At their closed upper ends, the complementary half units $8a$ and $8b$ are respectively provided with interlocking lugs 29 and 30, by which the two halves at the one end of the shell are held in rigid abutting relation to each other.

At the opposite end of the shell $8a$—$8b$ it is provided with an open hexagonal or other flat-sided enlargement composed of two parts $31a$ and $31b$, which are respectively formed in the complementary half units $8a$ and $8b$. The bottom plate $2a$ of the cup-shaped element $1a$ of the primary socket A1 is provided with a correspondingly flat sided opening to receive and tightly grip the flat sided end of the two-part shell. The shell is provided with a bead 32 against which the one face of the base plate $2a$ bears, and the extreme end of the two-part shell is bent radially outward, around the under face of the plate $2a$ as shown at $22a$ and $22b$ in Fig. 9, to maintain the two parts of the shell and its cup together as an integral single unit.

The cup-shaped element $1a$ is provided with an axially extending marginal flange $3a$ from which projects a plurality of axial prongs $4a$ by which the primary socket A1 is retained in the preformed boring of the leg C1 of the article being supported.

In a like manner, the secondary socket B1 comprises two complementary half sleeve sections $11a$ and $11b$, in which the half portions of the external threads $12a$ are respectively formed for engagement with the threads $7a$ formed in the half units $8a$ and $8b$ collectively, of the primary socket A1. The longitudinal edges $33a$ and $33b$ of the half sections $11a$ and $11b$ are matched in abutting flush relation to each other to complete the cylindrical body of the sleeve $11a$—$11b$. The upper end of the sleeve $11a$—$11b$ is provided with a frusto-conical end $15a$ provided with longitudinal recesses $14a$ by which said end is rendered resilient to slip over the head $d1$ of the smooth shank $d$ of the caster D and to snap behind the annular shoulder $d2$ of said shank.

The lower end of the two-part sleeve $11a$—$11b$ is also provided with a flat-sided enlargement formed in two parts $34a$ and $34b$ in the half sections $11a$—$11b$ respectively of the cylindrical body of the secondary socket B1. The operating element $16a$ of the secondary socket B1 includes a base plate $17a$ in which is formed a corresponding flat-sided opening 35 into which the flat-sided enlarged end $34a$, $34b$ of the cylindrical sleeve $11a$—$11b$ fits, with a bead 36 engaging the one surface of the plate $17a$ and the outwardly bent ends $37a$ and $37b$ of the sleeve sections $11a$ and $11b$ respectively bent radially outward around the opposite face of the plate $17a$, to retain the operating element $16a$ and sleeve sections $11a$—$11b$ in relatively fixed relation to each other.

The operating element $16a$ is provided with an axially extending marginal flange $18a$ which projects upwardly and around, and partly conceals the base cup element $1a$ of the primary socket A1.

I claim:

1. An adjustable caster structure comprising a smooth shanked floor engaging element, an internally threaded hollow primary socket including a shell portion insertable to a predetermined extent axially into a leg of an article to be supported by said structure and an exposed base portion at one end of said shell, a hollow externally threaded secondary socket adapted to receive said shank and insertable into said primary socket for rotary engagement with the internal threads thereof for varying the effective length of said leg, prongs on said exposed base portion for anchoring said primary socket in said leg, and a cup-like actuating element on and rigidly secured to the outer end of said secondary socket with said cup-like element extending around and at least partially enclosing the exposed base of said primary socket.

2. An adjustable caster structure comprising a smooth shanked floor engaging element, a primary socket including a base portion in the form of a cup, an internally threaded nut non-rotatable seated in said cup, and a hollow shell portion insertable axially into a leg of an article to be supported by said structure, and a hollow externally threaded secondary socket adapted to receive said shank and insertable into said primary socket for rotary engagement with the internal threads of said nut for varying the effective length of said leg.

3. An adjustable caster structure comprising a smooth shanked floor engaging element, a primary socket including a base portion in the form of a cup, an internally threaded nut non-rotatable seated in said cup, and a hollow shell portion insertable axially into a leg of an article to be supported by said structure, means for securing said cup nut and shell together as an integral unit, and a hollow externally threaded secondary socket adapted to receive said shank and insertable into said primary socket for rotary engagement with the internal threads of said nut for varying the effective length of said leg.

4. An adjustable caster structure comprising a smooth shanked floor engaging element, a primary socket consisting of a cup-shaped base element provided with an axially extending marginal flange, an internally threaded nut seated in said cup, a hollow shell insertable axially into a leg of an article to be supported by said structure and provided with a radial flange seated on said nut within said cup, ears bent inwardly from the marginal flange of said cup over the radial flange of said shell to secure said cup nut and shell together as an integral unit, and a hollow externally threaded secondary socket adapted to receive said shank and insertable into said primary socket for rotary engagement with the internal threads of said nut for varying the effective length of said leg.

5. An adjustable caster structure comprising a smooth shanked floor engaging element, a primary socket consisting of a cup-shaped base element provided with an axially extending marginal flange, an internally threaded nut seated in said cup, a hollow shell insertable axially into a leg of an article to be supported by said structure and provided with a radial flange seated on said nut within said cup, ears bent inwardly from the marginal flange of said cup over the radial flange of said shell to secure said cup nut and shell together as an integral unit, axially extending prongs formed on said marginal flange intermediate said ears for retaining said primary socket in said leg, and a hollow externally threaded secondary socket adapted to receive said shank and insertable into said primary socket for rotary engagement with the internal threads of said nut for varying the effective length of said leg.

6. An adjustable caster structure comprising a smooth shanked floor engaging element provided with an annular shoulder, an internally threaded hollow primary socket an exposed base portion and a hollow shell portion insertable to a predetermined extent axially into a leg of an article to be supported by said structure, a secondary socket comprising an outer externally threaded sleeve insertable into said primary socket for rotary engagement with the internal threads thereof for varying the effective length of said leg, an inner sleeve including a portion extending axially beyond the inner end of said outer sleeve and longitudinally slotted to slip over and snap behind said shoulder, and a cup-shaped actuating element provided with an axially extending marginal flange enclosing the exposed base of said primary socket to a variable extent.

7. An adjustable caster structure comprising a smooth shanked floor engaging element, an internally threaded hollow primary socket insertable to a predetermined extent axially into a leg of an article to be supported by said structure, and a secondary socket comprising an externally threaded outer sleeve provided with alternating axially extending ears and recesses circumferentially of one end thereof, said outer sleeve being insertable into said primary socket for rotary engagement with the internal threads thereof for varying the effective length of said leg, an inner sleeve adapted to receive and retain the shank of said element therein, and an operating member comprising a flat plate portion with a central aperture defined by alternating radial lugs and recesses respectively interfitting and interlocking with the alternating recesses and ears of said outer sleeve, with the ends of said sleeve ears clinched under said plate to secure said outer sleeve and operating element together as an integral unit.

8. An adjustable caster structure comprising a smooth shanked floor engaging element, an internally threaded hollow primary socket insertable to a predetermined extent axially into a leg of an article to be supported by said structure, and a secondary socket comprising an externally threaded outer sleeve provided with alternating axially extending ears and recesses circumferentially of one end thereof, said outer sleeve being insertable into said primary socket for rotary engagement with the internal threads thereof for varying the effective length of said leg, an inner sleeve adapted to receive and retaining the shank of said element therein, and provided with radial alternating ears and recesses respectively interfitting and interlocking with the axial recesses and ears of said outer sleeve, and an operating member comprising a flat disc portion having a central aperture defined by alternating radial lugs and recesses respectively interfitting and interlocking with the axial recesses and ears of said outer sleeve and with the radial ears of inner sleeve resting on the upper surface of said disc and the ends of the ears of said outer sleeve clinched under the bottom surface of said disc to secure said sleeves and actuating element together as an integral unit.

9. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member formed of a pair of similar complementary semi-cylindrical sections with complementary half portions of the threads constituting parts of said complementary sections respectively, and with corresponding longitudinal edges of said sections matched and in substantially flush abutting relation to each other.

10. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member with one polygonal open end and formed of a pair of similar complementary semi-cylindrical sections with complementary half portions of the threads and the polygonal open end thereof constituting parts of said complementary sections respectively, and with corresponding longitudinal edges of said sections matched and in substantially flush abutting relation to each other.

11. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member with one polygonal open end and formed of a pair of similar complementary semi-cylindrical sections, with complementary half-portions of the threads and of the polygonal open end of said member constituting parts of said complementary sections respectively, and with corresponding longitudinal edges of said sections matched and in substantially flush abutting relation to each other, and a disc-like element provided with a complementary polygonal aperture surrounding said polygonal end of said member and securing the complementary semi-cylindrical sections of said member together at the polygonal end thereof.

12. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member with one polygonal open end and formed of a pair of similar complementary semi-cylindrical sections with complementary half portions of the threads and the polygonal open end of said member constituting parts of said complementary sections respectively, and with corresponding longitudinal edges of said sections matched and in substantially flush abutting relation to each other, a disc-like element provided with a complementary polygonal aperture surrounding said polygonal end of said member and securing the complementary semi-cylindrical sections of said member together at the polygonal end thereof, and a marginal flange on said disc-like element extending axially around the polygonal end of said member.

13. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member with one polygonal open end and formed of a pair of similar complementary semi-cylindrical sections with complementary half portions of the threads and the polygonal open end of said member constituting parts of said complementary sections respectively, and with corresponding longitudinal edges of said sections matched and in substantially flush abutting relation to each other, a disc-like element provided with a complementary polygonal aperture surrounding said polygonal end of said member and securing the complementary semi-cylindrical sections of said member together at the polygonal end thereof, a marginal flange on said disc-like element extending axially around the polygonal end of said member, and securing prongs extending axially from said marginal flange of the primary socket.

14. An adjustable caster structure comprising a smooth shanked floor engaging element, an internally threaded hollow primary socket insertable to a predetermined extent axially into a leg of an article to be supported by said structure, and a hollow externally threaded secondary socket adapted to receive said shank and insertable into said primary socket for rotary engagement with the internal threads thereof for varying the effective length of said leg, each socket comprising an elongated cylindrical member with one polygonal open end and formed of a pair of similar complementary semi-cylindrical sections with complementary half portions of the threads and the polygonal open end of said member constituting parts of said complementary sections respectively, and with corresponding longitudinal edges of said sections matched and in substantially flush abutting relation to each other, a disc-like element provided with a complementary polygonal aperture surrounding said polygonal end of said member and securing the complementary semi-cylindrical sections of said member together at the polygonal end thereof, a marginal flange on said disc-like element extending axially around the polygonal end of said member, and a frusto conical opposite end on the cylindrical member of said secondary socket and slotted longitudinally to slip over and snap behind an annular shoulder on said shank.

CHARLES R. NALLE.